United States Patent [19]

Ranganathan et al.

[11] Patent Number: 5,553,272
[45] Date of Patent: Sep. 3, 1996

[54] VLSI CIRCUIT STRUCTURE FOR DETERMINING THE EDIT DISTANCE BETWEEN STRINGS

[75] Inventors: Nagarajan Ranganathan, Tampa, Fla.; Raghu Sastry, Campbell, Calif.

[73] Assignee: The University of South Florida, Tampa, Fla.

[21] Appl. No.: 316,320

[22] Filed: Sep. 30, 1994

[51] Int. Cl.⁶ .............................. G06F 3/00; G06F 15/00
[52] U.S. Cl. ......................... 395/500; 364/488; 364/489; 364/490; 364/491; 395/375; 395/800; 395/600; 341/51; 341/67; 371/37.1; 371/37.6
[58] Field of Search ................... 364/488, 489, 364/490, 491, 146.1, 229, 229.1, 229.5, 259.2, 754; 341/51, 67; 382/40, 14, 34; 395/550, 800, 375, 500, 600; 348/396, 397, 620, 452, 113; 371/43, 37.1, 42, 44, 38.1, 37.6

[56] References Cited

U.S. PATENT DOCUMENTS

| | | | |
|---|---|---|---|
| 4,450,520 | 5/1984 | Hollaar et al. ........................ | 395/550 |
| 4,698,751 | 10/1987 | Parvin .................................... | 395/800 |
| 4,760,523 | 7/1988 | Yu et al. ................................. | 364/800 |
| 4,835,775 | 5/1989 | Seroussi ................................. | 371/37.1 |
| 4,845,610 | 7/1989 | Parvin .................................... | 395/800 |
| 4,958,348 | 9/1990 | Berlekamp et al. ..................... | 371/42 |
| 4,958,377 | 9/1990 | Takahashi .............................. | 382/218 |
| 4,979,101 | 12/1990 | Takahashi .......................... | 364/419.13 |
| 4,992,933 | 2/1991 | Taylor .................................... | 395/375 |
| 5,008,818 | 4/1991 | Bocast .................................... | 395/375 |
| 5,051,947 | 9/1991 | Messenger et al. .................... | 364/800 |
| 5,157,671 | 10/1992 | Karplus ................................... | 371/43 |
| 5,179,378 | 1/1993 | Ranganathan et al. ................. | 341/51 |
| 5,276,741 | 1/1994 | Aragon ................................... | 382/40 |
| 5,329,405 | 7/1994 | Hou et al. ............................... | 395/800 |
| 5,377,349 | 12/1994 | Motomura .............................. | 395/600 |
| 5,440,753 | 8/1995 | Hou et al. ............................... | 395/800 |

Primary Examiner—Kevin J. Teska
Assistant Examiner—Jacques H. Louis-Jacques
Attorney, Agent, or Firm—Calfee, Halter & Griswold

[57] ABSTRACT

The edit distance between two strings $a_1, \ldots, a_m$ and $b_1, \ldots, b_n$ is the minimum cost s of a sequence of editing operations (insertions, deletions and substitutions) that convert one string into the other. This invention provides VLSI circuit structure for computing the edit distance between two strings over a given alphabet. The circuit structure can perform approximate string matching for variable edit costs. More importantly, the circuit structure does not place any constraint on the lengths of the strings that can be compared. It makes use of simple basic cells and requires regular nearest-neighbor communication, which makes it suitable for VLSI implementation.

22 Claims, 9 Drawing Sheets

VLSI CIRCUIT STRUCTURE FOR DETERMINING THE EDIT DISTANCE BETWEEN STRINGS

GOVERNMENT SUPPORT

This invention was at least partially supported by the National Science Foundation grant no. 9010358. The government may have certain rights in this invention.

TECHNICAL FIELD

This invention relates to VLSI circuit structure for determining the edit distance between two strings.

BACKGROUND

In approximate string matching (also known as the string-to-string correction problem), a similarity measure called the edit distance needs to be computed between two strings. This distance is computed using three editing operations, substitution, deletion and insertion. Each of these operations has a cost associated with it. The objective of approximate string matching is to determine the minimum cost required to transform one string into another using these three editing operations.

String comparison is an important task in many disciplines. It has applications in information retrieval, pattern recognition, error correction, molecular genetics, and text search and edit systems. Recent advances in Very Large Scale Integration (VLSI) technology have made the development of special purpose circuit structures for complex, computationally intensive tasks possible. High packaging densities, decrease in gate delays, decreasing fabrication costs, powerful CAD design automation tools, and reliable and fault-tolerant design strategies are some of the advantages of present day VLSI technology. The attributes of parallelism, concurrency, pipelining, modularity and regularity have become standard features of special purpose hardware designs. VLSI solutions often represent inexpensive implementations for high-performance designs.

SUMMARY OF THE PRESENT INVENTION

The present invention provides new and useful VLSI circuit structure for determining the edit distance between two strings.

According to the present invention, the VLSI circuit structure includes an array of processing elements designed to process string symbols in a systolic fashion. By "systolic fashion" applicants mean that the processing elements are connected in a pipeline fashion, with each processor connected only to an immediately adjacent processor. Each processing element is adapted to receive as inputs pairs of string symbols. Each processing element includes a comparator which compares a pair of string symbols and outputs a signal which has a value of 1 if the pair of string symbols match and a value of 0 if the pair of symbols do not match. Each processing element further includes a difference computation module which receives difference values associated with the pair of string symbols and also receives the output of the comparator. The difference computation module has stored therein the lists for predetermined editing operations associated with the string symbols, and produces a pair of outputs for each pair of string symbols. Each of the outputs from the difference computation module comprises a new difference value related to the editing costs for one of the string symbols that was input and compared by the comparator. Each processing element is designed to produce a pair of outputs, each of which comprises one of the pair of string symbols and the new difference value related to the editing cost for the string symbol. A partitioning technique can be used for handling strings which are too long to be compared with one pass through the array of processing elements.

The VLSI circuit structure according to the invention can provide approximate string matching for variable edit costs. Moreover, it is relatively simple, and it does not place any constraint on the lengths of the strings that can be compared.

The VLSI circuit structure according to the invention is believed to have application in various disciplines (e.g., information retrieval, pattern recognition, error correction, molecular genetics, and text search and edit systems) in which VLSI circuits for performing complex, computationally intensive tasks are becoming increasingly attractive.

Further features of the present invention will become further apparent from the following detailed description and the accompanying drawings.

DETAILED DESCRIPTION OF THE PREFERRED EMBODIMENT

Figure 1:
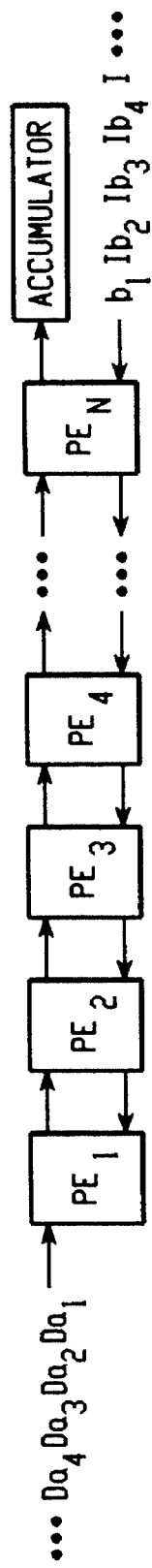
FIG. 1 is a schematic illustration of linear, systolic VLSI circuit structure for performing string matching, according to the principles of the present invention.

As described above, the present invention relates to VLSI circuit structure, including a systolic array of processing elements, for determining the edit distance between two strings. The following description provides some background on the concept of string matching, the determination of the edit distance between two strings, and the manner in which the invention can be implemented in a VLSI chip with seven (7) processing elements. From this description, it will be clear that VLSI circuit structures using different numbers of processing elements can be implemented using the principles of the invention will be clear to those skilled in the art.

1. EDIT DISTANCE COMPUTATION

This section provides an overview of how the edit distance between two strings is determined.

Let A be a finite string of length m, and A(i) be the i-th character of this string. A(i,j) is defined as the i-th through j-th symbols of A. If i>j then A(i,)=Λ, the null string. An edit operation is a pair (a,b)≠(Λ,Λ), where the lengths of a,b are less than or equal to 1, and is represented as a→b. Let Σ represent the finite alphabet. The three edit operations are:

(i) substitution: a symbol at position i is substituted by a new symbol b ∈ Σ to give $a_1, \ldots a_{i-1}, b, a_{i+1}, \ldots a_m$. This is represented as a→b.

(ii) deletion: a symbol from a position i is deleted to give $a_1, \ldots, a_{i-1}, a_{i+1}, \ldots, a_m$. This is represented as a→Λ.

(iii) insertion: a symbol b ∈ Σ is inserted at position i to give $a_1, \ldots a_i, b, a_{i+1}, \ldots a_m$. This is represented as Λ→b.

Further, each edit operation has a cost associated with it γ (a→b). The cost of a string of edit operations is computed by adding up the individual edit operation costs. The distance, δ(A,B) between two strings A and B is defined as the minimum cost of all possible edit sequences transforming string A into string B, i.e. δ(A,B)=min (Y(S)|S is an edit sequence.

A standard dynamic programming method [see e.g. K. Abe and N. Sugita, "Distances between strings of symbols—review and remarks", *Proc. ICPR*, 1982, pp. 172–174; H. Bunke and a. Sanfeliu (Eds.), *Syntactic and Structural Pattern Recognition: Theory and Applications*, World Scientific Publishing Co., Singapore, 1990; M. Maes, "Polygonal shape recognition using string matching techniques", *Pattern Recognition*, Vol. 24, No. 5, 1991, pp. 433–440; E. Ukkonen, "Algorithms for approximate string matching", *Information and Control*, Vol. 64, 1985, pp. 100–118; R. A. Wagner and M. J. Fischer, "The string-to-string correction problem", *J. Assoc. Comput. Mach.*, Vol. 21, No. 1, 1974, pp. 168–173.] is used to determine the edit distance between the strings. Let D(i,j)=δ(A(1,i),B(1j), 0≤i≤m, 0≤j≤n. Then:

$$D(i,j) = \min \begin{cases} D(i-1,j-1) + \gamma(A(i) \to B(j)), \\ D(i-1,j) + \gamma(A(i) \to \Lambda), \\ D(i,j-1) + \gamma(\Lambda \to B(j)). \end{cases}$$

Further: for all $1 \leq i \leq m$, $1 \leq j \leq n$.

$D(0,0) = 0$
$D(0,i) = D(0,i-1) + \gamma(\Lambda, B(i)), 1 \leq i \leq n$
$D(i,0) = D(i-1,0) + \gamma(A(i),\Lambda), 1 \leq i \leq m$ Thus, moving one step down in the table corresponds to a deletion, a step across corresponds to an insertion, and moving a step diagonally a substitution. The solution represents the minimum distance path starting at D(0,0) and arriving at D(m,n,). A sample edit distance matrix, generated while comparing strings aabcb and abab, is shown below. The costs for substitution, insertion and deletion are 3,2, and 2 respectively. The cost associated with substituting a character by itself is assumed to be 0.

|   |   | a | a | b | c | b |
|---|---|---|---|---|---|---|
|   | 0 | 2 | 4 | 6 | 8 | 10 |
| a | 2 | 0 | 2 | 4 | 6 | 8 |
| b | 4 | 2 | 3 | 2 | 4 | 6 |
| a | 6 | 4 | 2 | 4 | 5 | 7 |
| b | 8 | 6 | 4 | 2 | 4 | 5 |

The edit distance between these 2 strings is given by D(4,5), and is equal to 5. Clearly, abab can be converted into aabcb by inserting an a at the beginning of the first string, and replacing the last a by a c. The total cost for performing these 2 edit operations is 2+3=5, the same result obtained from the standard dynamic programming method.

2. STRING MATCHING

There are different known string matching techniques; specifically (i) Exact String Matching (ii) Longest Common Subsequence String Matching (LCS) and (iii) Approximate String Matching.

In exact string matching [see e.g. R. S. Boyer, and J. S. Moore, "A fast string searching algorithm", *Commun. ACM*, Vol. 20, No. 10, 1977, pp. 762–772; D. E. Knuth, J. H. Morris, and V. R. Pratt, "Fast pattern matching in strings", *SIAM J. Comput.*, Vol. 6, 1977, pp. 323–350], all occurrences of a finite pattern stream need to be identified in a possibly endless input stream of characters. The characters are assumed to be drawn from a finite alphabet, and wild cards and regular expressions can be used during the search process. Exact string matching has applications in text searching and information retrieval. New approaches to text searching that allow errors have been suggested [see e.g. R. Baeza-Yates and G. H. Gonnet, "A new approach to text searching", *Commun. ACM*, Vol. 35, No. 10, 1992, pp. 74–82, S. Wu and U. Manber, "Fast text searching allowing errors", *Commun. ACM*, Vol. 35, No. 10, 192, pp. 83–91], and hardware solutions have also been proposed [see e.g. M. J. Foster and H. T. Kung, "The design of special-purpose VLSI chips", *IEEE Computer*, January 1980, pp. 26–38, M. E. Isenman and D. E. Shasha, "Performance and architectural issues for string matching", *IEEE Trans. Comput.*, Vol. 39, No. 2, 1990, pp. 238–249, A. Mukhopadhyay, "Hardware algorithms for nonnumeric computation", *IEEE Trans. Computers*, Vol. C-28, No. 6, 1979, pp. 384–394, N. Tewari and M. D. Wagh, "Bi-sequential array for pattern matching", *Proc. of the IEEE*, Vol. 74, No. 10, 1986, pp. 1465–1466].

A closely related topic to approximate string matching is the Longest Common Subsequence String Matching [see e.g. 4,17, H. Bunke and a. Sanfeliu (Eds.), *Syntatic and Structural Pattern Recognition: Theory and Applications*, World Scientific Publishing Co., Singapore, 1990; A. Mukherjee, "Hardware algorithms for determining similarity between two strings", *IEEE Trans. on Comp.*, Vol. 38, No. 4, 1989, pp. 600–603], where the similarity between two strings is represented in terms of the length of the longest common subsequence between them. This length can also be computed using the edit distance computation technique described in the previous section, with edit costs of 2,1 and 1 for substitution, insertion and deletion respectively. This approach, however, does not support variable edit costs, and therefore, can not be used in certain applications. For example, in applications such as data communication, where error correction is required, an edit cost is dependent on the probability of that error occurring.

The approximate string matching technique underlies the present invention Approximate string matching is significantly different from exact string matching, which requires a different type of computation and looks at an entirely different application domain, viz., text searching. The longest common sequence technique is a special case of the general approximate sting matching approach. The approximate string matching approach has numerous applications in pattern recognition, error correction, and molecular genetics.

Cheng and Fu presented a set of VLSI architectures for string matching [see H. D. Cheng and K. S. Fu, "VLSI architectures for string matching and pattern matching, *Pattern Recognition*, Vol. 20, No. 1, 1987, pp. 125–141], which calculate the edit distance between two strings as well as the edit sequence.

Moreover, the VLSI circuit structure of the present invention does not place restrictions on the costs that the edit operations can take. The proposed encoding scheme for representing matrix elements permits the VLSI circuit structure to process arbitrary size strings. At the same time it minimizes the data flow between adjacent processors. Only two inputs need to be provided to the circuit structure during each clock cycle. A partitioning strategy to handle situations where the problem size is larger than the array size is also described. The systolic data flow between the processors in the proposed implementation is similar to that proposed by Lipton and Lopresti [see e.g. R. J. Lipton and D. Lopresti, "A systolic array for rapid string comparison," 1985 *Chapel Hill Conference on VLSI*, Ed. H. Fuchs, Computer Science Press: Rockville, Md., 1985, pp. 363–376].

3. ENCODING SCHEME

The encoding scheme underlying the present invention provides a new and useful way of representing the distance matrix elements. This permits the VLSI circuit structure of the invention to perform approximate string matching with variable edit costs, and to process arbitrarily long strings.

With the standard dynamic programming scheme referred to in Section 1, it can be observed that the distance matrix elements can take large values when lengthy strings are being compared. Most applications for approximate string matching require fairly long strings to be compared. For instance, DNA sequences are typically several million bases long, protein molecules contain thousands of amino acids, and databases contain millions of characters. A naive implementation of the dynamic programming scheme would require each processor to add and compare relatively large data values, on the order of log(n) bits for strings of length n. Such adders and comparators would require a significant amount of silicon real estate. Moreover, the widths of the communication channels required to exchange data between adjacent processors would be very large. The real estate required for routing these interconnections would also be prohibitive. It is unlikely that more than a couple of processors could be accommodated within a chip, making such an implementation economically impractical.

However, by representing the distance matrix elements in an alternative manner, it is possible to make the manipulation of such large values unnecessary. Applicants' encoding scheme shows that a constant number of bits will suffice for comparisons of strings of arbitrary lengths. This encoding is based on the observation that adjacent distance matrix elements can not differ greatly in magnitude. Instead of computing a distance matrix element, only the difference between a matrix element, $D(i,j)$, and the matrix elements to its left, $D(i,j-1)$, and top, $D(i-1,j)$, need to be computed. These two values completely represent any matrix element. This encoding scheme is, therefore, an alternative representation for the distance matrix.

To understand the applicants' encoding scheme, let the costs of substitution, insertion and deletion be S, I, and D respectively. It is shown below that there is a bound on the range of values that the differences between any matrix element and its left and top neighbors can take.

Lemma 1 The difference between a matrix element and its left and top neighbors is as shown in the 2×2 matrix fragment:

$$b \in [a-D, a+I]$$
$$c \in [a-I, a+D] \quad d \in [c-D, c+I] \quad \text{and}$$
$$d \in [b-I, b+D]$$

Proof. Consider the matrix fragment:

$$\begin{array}{c|cc}
 & y_j & \\
 & \vdots & \vdots \\
 & \ldots & a & b \\
x_i & \ldots & c & d
\end{array}$$

(i) Case 1: From the dynamic programming algorithm applicants note that $$d = \begin{cases} \min(c+I, b+D, a) & \text{if } x_i = y_j; \\ \min(c+I, b+D, a+S) & \text{if } x_i \neq y_j. \end{cases}$$

It directly follows from the above rule that $d-c \leq I$ and $d-b \leq D$. This result gives the upper bound for the differences between a matrix element and its left and top neighbors.

(ii) Case 2: From the result obtained in Case 1, it can be seen that the largest values that b and c can take are $b=a+I$ and $c=a+D$. From the dynamic programming rule, applicants observe that the smallest value that d can take is a. Thus, $d-b \geq -I$ and $d-c \geq -D$.

This result gives the lower bound on the differences between a matrix element and its left and top neighbors.

Cases 1 and 2 together prove the Lemma. □

Corollary 1 The difference between any matrix element and its left and top neighbors is bounded by $\pm \max(I,D)$.

Proof. This follows from Lemma 1. □

It can be seen that each matrix element can be represented by 2 numbers (i) the difference between the element and its left neighbor, and (ii) the difference between the element and its top neighbor. From Corollary 1 we observe that these differences are bounded by $\pm \max(I,D)$. Thus, only $\lceil \log_2(2\max(I,D)+2) \rceil$ bits are required to represent each difference, irrespective of the lengths of the strings being compared. This observation had led to the design of an efficient architecture that can compare strings of arbitrary lengths, with variable costs for the edit operations.

Lipton and Lopresti [R. J. Lipton and D. Lopresti, "Delta transformations to simplify VLSI processor arrays for serial dynamic programming," *Proc. ICPP,* 1986, pp. 917–920] show that modulo $\Delta$ arithmetic, where $\Delta \geq 4C+1$, can be used in the computations of the algorithm, when the edit costs lie between 0 and C. Each processing element of an implementation based upon their delta transformation would compute a distance matrix element using the modulo arithmetic. However, in the encoding proposed in this paper, each distance matrix element is represented by 2 difference values, as explained earlier. Applicants have determined that these differences must lie between $\pm \max(I,D)$. It should be noted that the cost of substitution S, which is generally larger than I and D, does not factor into this bound. Each processing element of the proposed systolic architecture (based upon the proposed encoding) computes two difference values. One difference is transmitted to the adjacent processing element on the left while the other difference is transmitted to the adjacent processing element on the right. The computational model represented by the resultant systolic algorithm is simple and novel.

The proposed systolic array architecture is described next.

4. VLSI CIRCUIT STRUCTURE OF THE PRESENT INVENTION

The VLSI circuit structure of the present invention provides a systolic array of processing elements which computes along a 45 degree diagonal simultaneously. This is possible as an element only depends on elements that are above and to its left. All the elements along the −45 degree diagonals are computed by the same processor. This is due to the fact that the strings to be compared are input to the array from opposite ends. In order to enable each symbol of one string to meet with each symbol of the other one, new values need to be provided to the array during alternate clock cycles. The block diagram of the proposed architecture is shown in FIG. 1.

As can be seen from the figure, new symbols of the strings are input every other cycle. In this application, the string that is input from the left is referred to as String A, and the other one as referred to as String B. With this scheme, each PE performs computations along a −45 degree diagonal. Specifically, the edit distance matrix for comparing strings of lengths m and n has m+n−1 such diagonals. Therefore, m+n−1 PEs are required to process strings with m and n symbols within a single pass.

The −45 degree diagonal starting at D(1,1) is referred to as the central diagonal. The index of the PE which performs computations for this diagonal can be controlled by delaying one of the strings as shown below. The diagonals that all other PEs perform computations for, are automatically decided based on their position in the array relative to this PE. Such manipulations are required to utilize a fixed size array for comparing strings with varying lengths, as long as their combined length is less than or equal to N+1, where N is the number of PEs in the array. Thus, depending upon the lengths of the two strings and the size of the array, the assignment of diagonals to the PEs can be easily manipulated. When the combined length of the input strings is greater than N+1, the partitioning strategy discussed in Section 7 is to be used.

Consider an implementation with N PEs.

Lemma 2 For PE(j) to be responsible for computations along the central diagonal, one of the strings has to be delayed with respect to the other by |N−2j+1| cycles. Which string needs to be delayed depends upon the sign of (N−2j+1).

Proof. Assume that $a_i$ and $b_i$ are input to the system at T=x and T=y respectively. $a_i$ will reach PE(j) after j−1 cycles at T=x+j−1. Similarly, $b_i$ will reach PE(j) after N−j cycles at T=y+N−j. For these to meet at PE(j), we have x+j−1=y+N−j. This implies that x=y+(N−2j+1). □

For the analysis shown below it is assumed that the PE(j) is responsible for computations along the central diagonal. It is also assumed that $b_i$ is input to the system at T=y and $a_1$ at T=y+(N−2j+1).

Theorem 1 PE(k) performs computations along the −45 degree diagonal with i=I+(j−k).

Proof. Symbol $a_i$ is input to PE(1) at T=y+N−2j+2i−1. It reaches PE(k) after another k−1 clock cycles at T=y+N−2j+2i+k−2. Symbol $b_1$ is input to PE(N) at T=y+2(I−1). It reaches PE(k) after another N−k clock cycles at T=y+N+2I−k−2. Equating these two, we get i=I+(j−k). □

Thus, PE(j) performs computations along the −45 diagonal starting at D(1,1), while PE(j−1) does so for the diagonal starting at D(2,1), and PE(j+1) for the diagonal starting at D(1,2). Since each PE performs computations along one diagonal, m+n−1 PEs are required to process strings of length m and n respectively.

Figure 2:
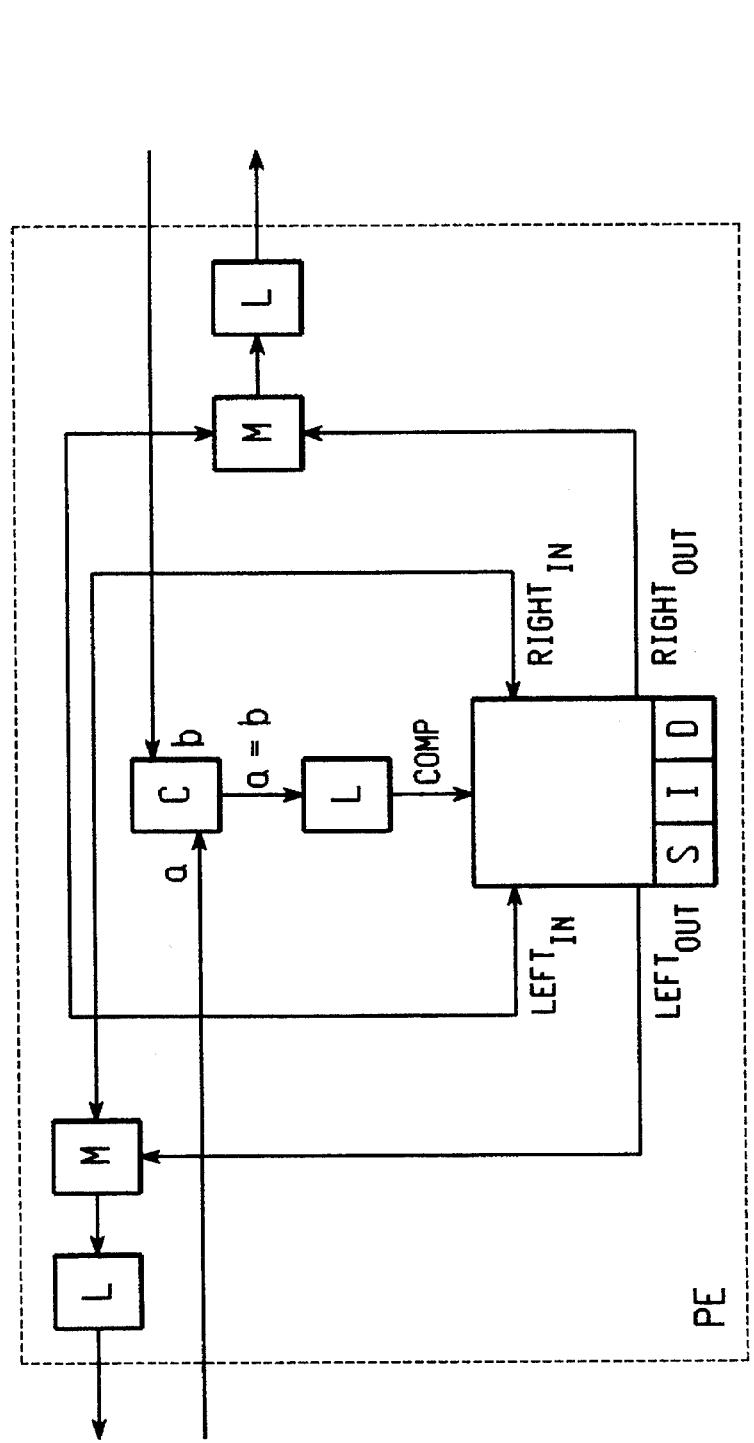
FIG. 2 is a schematic illustration of a processing element in VLSI circuit structure according to the present invention.

The block diagram of a Processing Element (PE) is shown in FIG. 2, where C denotes a comparator, L denotes a 1-bit latch and M denotes a mutliplexor. The S, I, and D registers within each PE are preloaded with the costs for substitution, insertion and deletion during an initialization phase. Interleaved with the characters of the strings are the data values from the first row and column of the edit distance matrix.

When two string symbols, say $a_i$ and $b_j$, enter a PE from opposite directions, a comparison is performed. During the next clock cycle, the symbols move out and the values following them enter the PE. The PE modifies these values based on the result of the symbol comparison in the previous cycle, and the values just shifted in. The actual computations performed during this cycle are shown in FIG. 2 where:

$$right_{out}=min(left_{in}+I, right_{in}+D, dia)-right_{in}$$

$$left_{out}=min(left_{in}+I, right_{in}+D, dia)-left_{in}$$

Where dia=0 if the output of the comparator is 1 dia=S if the output of the comparator is 0

S=substitution cost value stored in the difference computation module

D=deletion cost value stored in the difference computation module

I=insertion cost value stored in the difference computation module. Each PE computes the difference between the matrix element D(i,j) and the left and top neighbors, D(i,j−1) and D(i,j−1,j), during this cycle. The $left_{in}$ input contains the value D(i,j−1)−D(i−1,j−1), and the rightin contains the value D(i−1,j)−D(i−1,j−1). It can be seen that based on the computations performed within each PE, $left_{out}$=D(i,j,)−D(i,j,−1), and $right_{out}$= D(i,j) and D(i−1,j). These values are shifted out to adjacent PEs during the next clock cycle. The systolic timing and flow of data is show in FIG. 3, and the computations performed in FIG. 4. When the strings are shifted out of the array they carry with them the last column and row of the edit distance matrix. The final answer can be computed based on the last row or column of the matrix.

Figure 3:
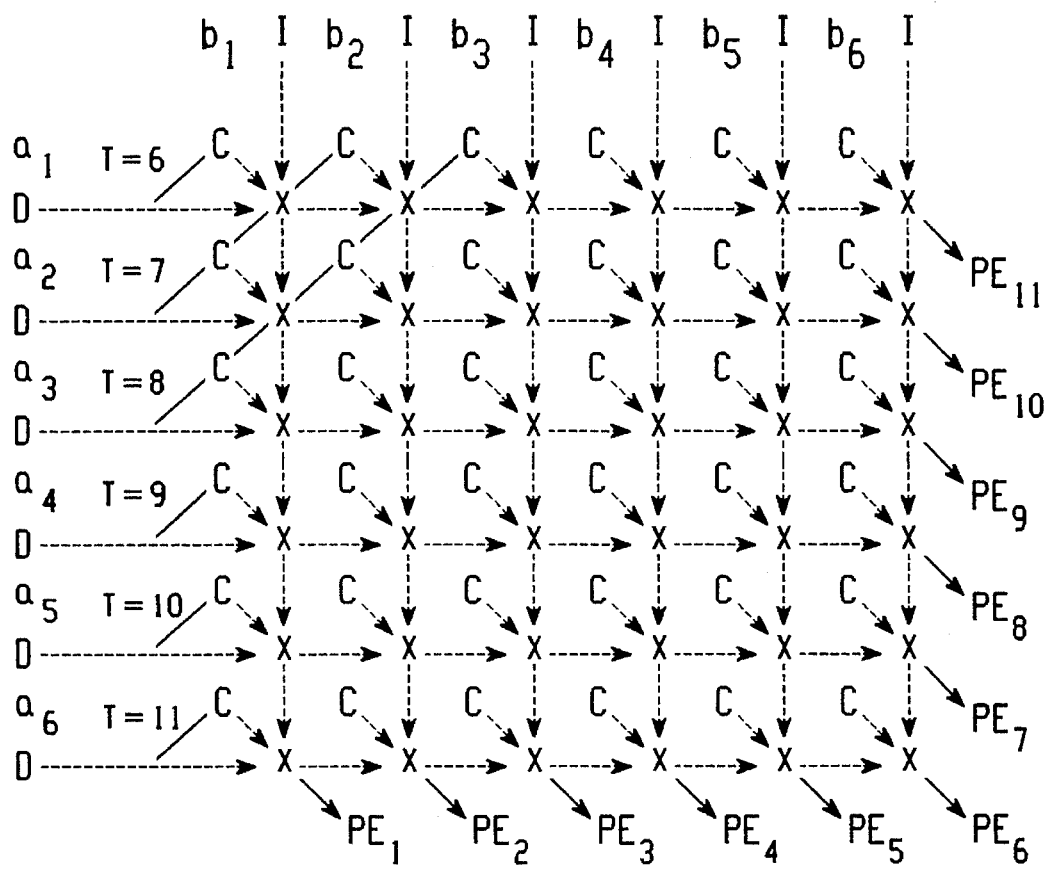
FIG. 3 is a systolic timing and data flow diagram for a VLSI circuit structure according to the present invention.
Figure 4:
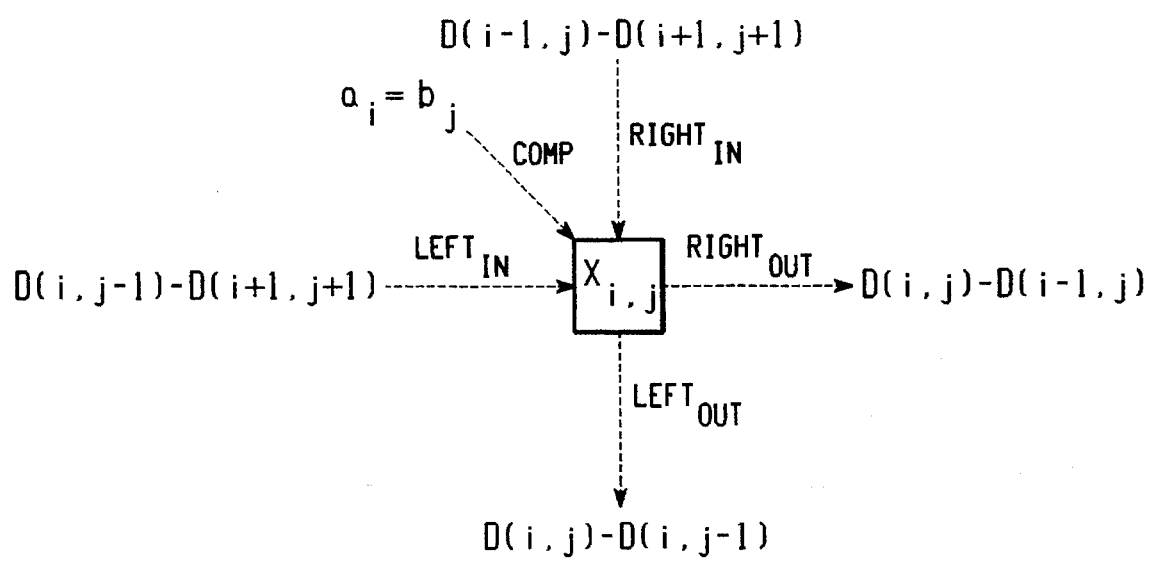
FIG. 4 is a diagram of a difference computation by a processing element in a VLSI circuit structure according to the present invention.

The data flow within the systolic array is shown in FIG. 3, where D is the Deletion Cost, I is the Insertion Cost, C is the Symbol Comparison, and X is the Difference Computation. This figure shows the order in which computations are performed, and the inputs that each PE receives during a particular clock cycle. As can be seen from the figure, each PE interleaves symbol comparisons (shown as C) and computing the difference between a matrix element and its left and top neighbors (shown as X). It can also be observed that a PE performs computations along a −45 degree diagonal, and that computations along 45 degree diagonals are performed concurrently. The data flow is similar to that described by Lipton and Lopresti [see e.g. R. J. Lipton and D. Lopresti, "Delta transformations to simplify VLSI processor arrays for serial dynamic programming," *Proc. ICPP*, 1986, pp. 917–920; R. J. Lipton and D. Lopresti, "A systolic array for rapid string comparison," 1985 *Chapel Hill Conference on VLSI*, Ed. H. Fuchs, Computer Science Press: Rockville, Md., 1985, pp. 363–376].

An advantage of this architecture is that minimal control is required. During alternate cycles, either a symbol or a difference value is transmitted to an adjacent PE. A multiplexer is sued to select the source during each clock cycle.

Since the same bus is used to transfer symbols and values between PEs, the maximum value that S, I and D can take is $2^r-1$, where r is the width of the bus. For example, with an 8-bit bus, the costs for the edit operations can be anything from 1 to 127. This represents an extremely wide range of values, making the architecture flexible and adequate for almost any application.

The edit distance computation itself can be performed using an accumulator, as shown in FIG. 1. The last row or last column values can be directly used to calculate the edit distance. The differences that are output during alternate cycles for the last column (row) are accumulated. The value obtained after accumulating the differences from the entire column (row) is then added to mD(nI) to obtain the edit distance, where m is the length of String A, and n that of String B. This accumulator is not a part of the architecture, but is provided externally. The width of the accumulator depends on the maximum value that a matrix element can take, and is, therefore, dependent on the edit costs and the lengths of the strings (or application).

Figure 5A:
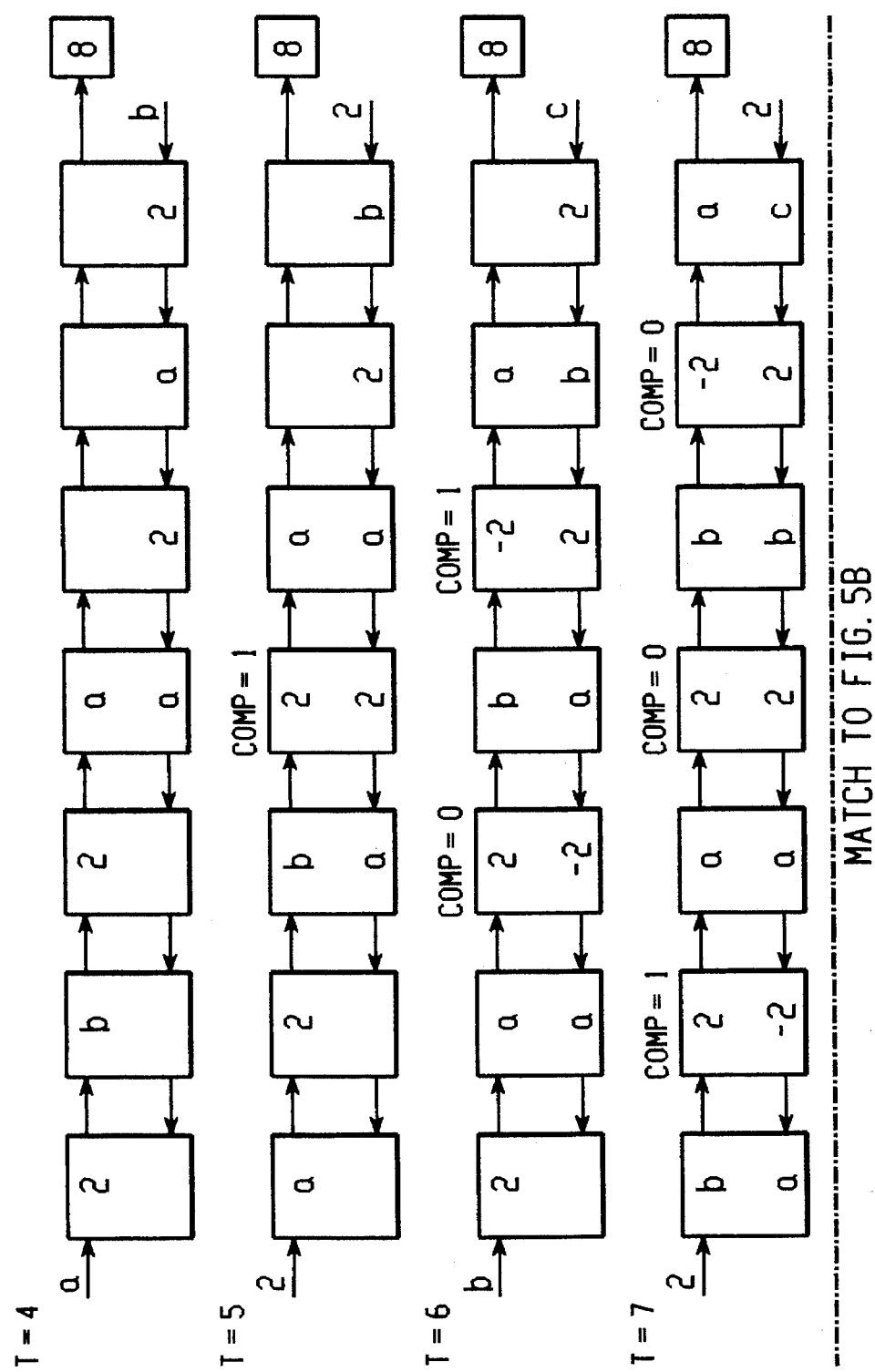
FIGS. 5A, 5B and 5C are a diagram of the operation of a VLSI circuit structure according to the present invention.
Figure 5B:
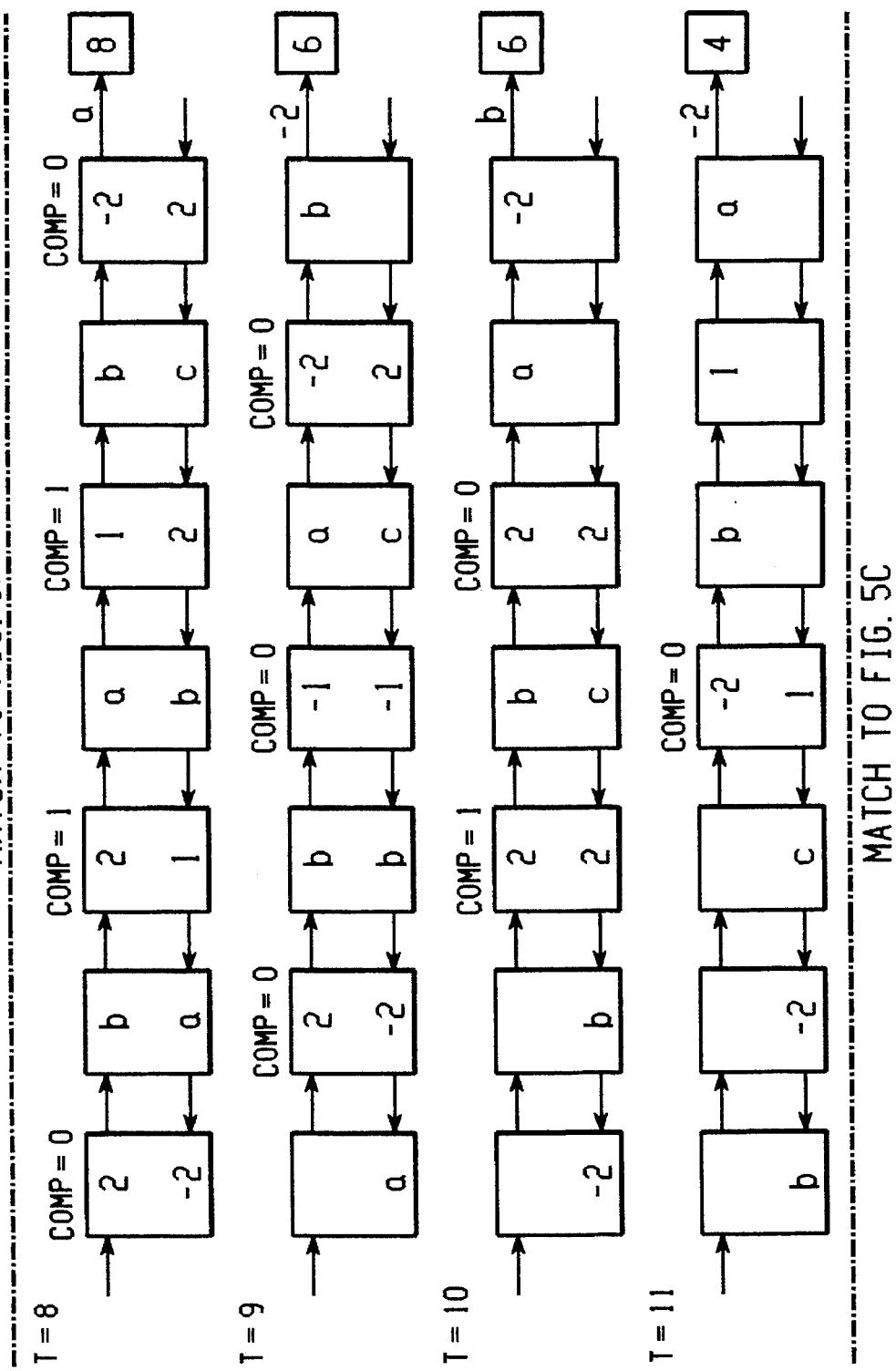
Figure 5C:
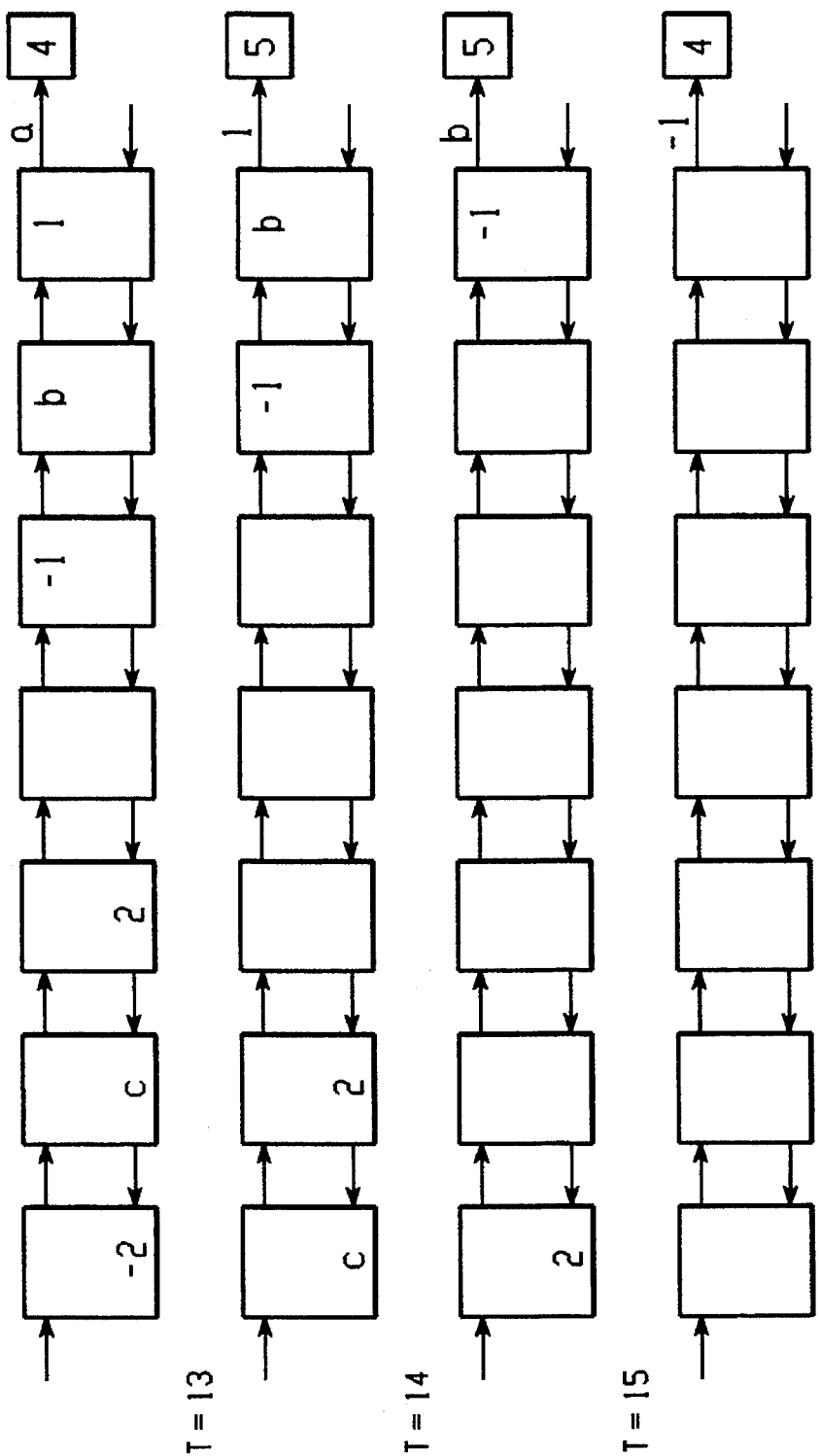

The operation of the architecture is demonstrated in FIGS. 5A, 5B and 5C, where the strings "aabc" and "abab" are being compared. Snapshots of the state of the processor array are shown from T=5 to T=15, at which time the edit distance between the two strings is obtained. The result of the character comparison during the previous clock cycle is shown above a processor as comp=0/1.

5. VLSI CHIP IMPLEMENTATION

A prototype VLSI chip has been designed and built implementing the proposed architecture using 2-micron CMOS p-well technology. The prototype chip can be used to compare strings of 8-bit symbols. The differences between neighboring matrix elements are represented using 6 bits. The chip design is based on a two-phase non-overlapping clocking scheme. Odd (even) numbered PEs perform a comparison operation during the $\phi_1(\phi_2)$ phase and a difference computation during $\phi_2(\phi_1)$. Symbols are input to the array during the $\phi_1$ phase and the insertion/deletion costs during the other phase. An advantage of the proposed architecture is that it is scalable. A larger array can be constructed by cascading a number of chips in series. The chip was designed using the Cadence OPUS automated design tools. The implementation involved three phases (i) development of standard library cells, (ii) functional design entry and verification, and (iii) synthesis of the final layout.

5.1 EXTERNAL INTERFACE

Figure 6:
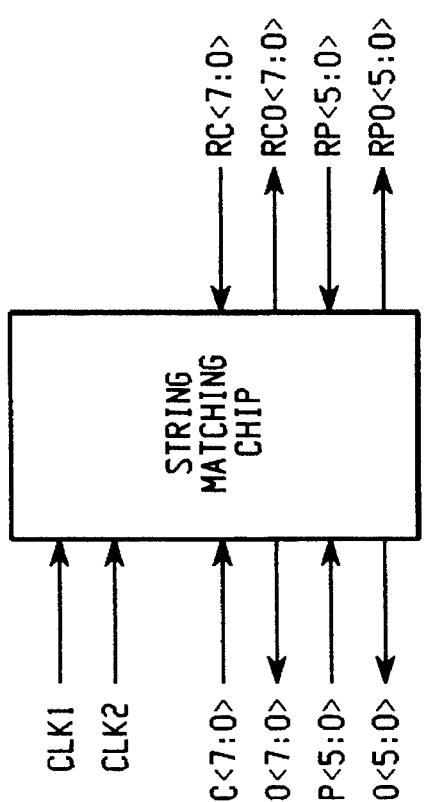
FIG. 6 is a schematic illustration of a VLSI chip having circuit structure according to the present invention, and showing the external interface of such a chip.

The block diagram of the chip with its associated input and output pins is shown in FIG. 6. In the prototype implementation, instead of multiplexing the characters and difference values, separate busses were used for each. The bus used to transfer the difference values was chosen to be 6-bits wide. A brief description of the I/O pins of the PE follows.

| i) | CLK1 | : $\phi_1$ phase. |
|---|---|---|
| ii) | CLK2 | : $\phi_2$ phase. |
| iii) | LC<7:0> | : 8-bit bus for character input from left neighbor. |
| iv) | RC<7:0> | : 8-bit bus for character input from right neighbor. |
| v) | LCO<7:0> | : 8-bit bus for character output to left neighbor. |
| vi) | RCO<7:0> | : 8-bit bus for character output to right neighbor. |
| vii) | LP<5:0> | : 6-bit bus for difference input from left neighbor. |
| viii) | RP<5:0> | : 6-bit bus for difference output from right neighbor. |
| ix) | LPO<5:0> | : 6-bit bus for difference output to left neighbor. |
| x) | RPO<5:0> | : 6-bit bus for difference output to right neighbor. |

The various phases in the operation of the chip are shown below.

i) Reset: Done by sending a series of O's along the LC and RC busses.

ii) Initialization: The cost of substitution (S) and insertion (I) are input on the RC bus while the cost of deletion (D) is input on the LC bus.

iii) Computation: During CLK1, the symbols of the first string are input on the LC bus and the symbols of the second string are input on the RC bus. During CLK2, the edit cost (D) is input on the LC bus and the edit cost (I) is input on the RC bus.

5.2 DESCRIPTION OF THE BASIC CELLS

Figure 7:
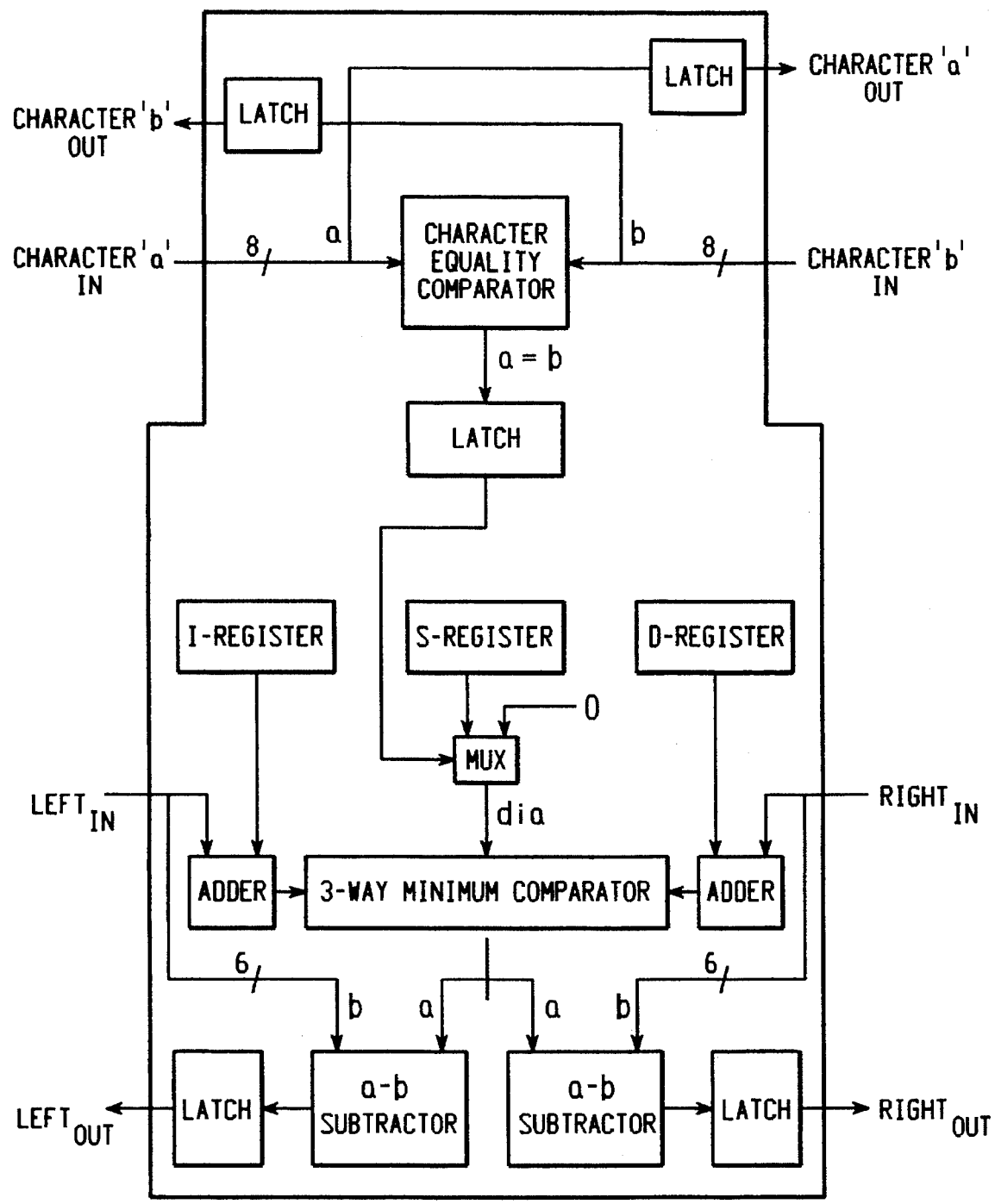
FIG. 7 is a block diagram of a processing element for the VLSI chip of FIG. 6.

The organization of the implemented PE is shown in FIG. 7. As can be seen from the figure, the PE implementation required the design of the following basic cells: (i) Recirculating Latch (ii) Adder (iii) Subtractor (iv) Equality Comparator and (v) 3-Way Minimum Comparator. The design of the first four cells is standard and is therefore not described any further. The design of the minimum comparator is described below.

3-Way Minimum Comparator

Figure 8:
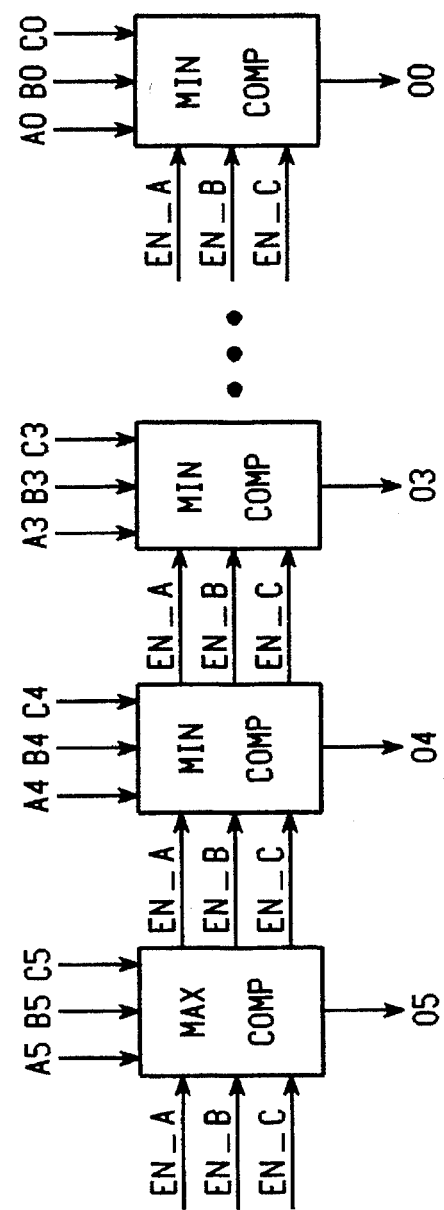
FIG. 8 is a schematic illustration of a minimum comparator for the VLSI chip of FIG. 6.
Figure 9:
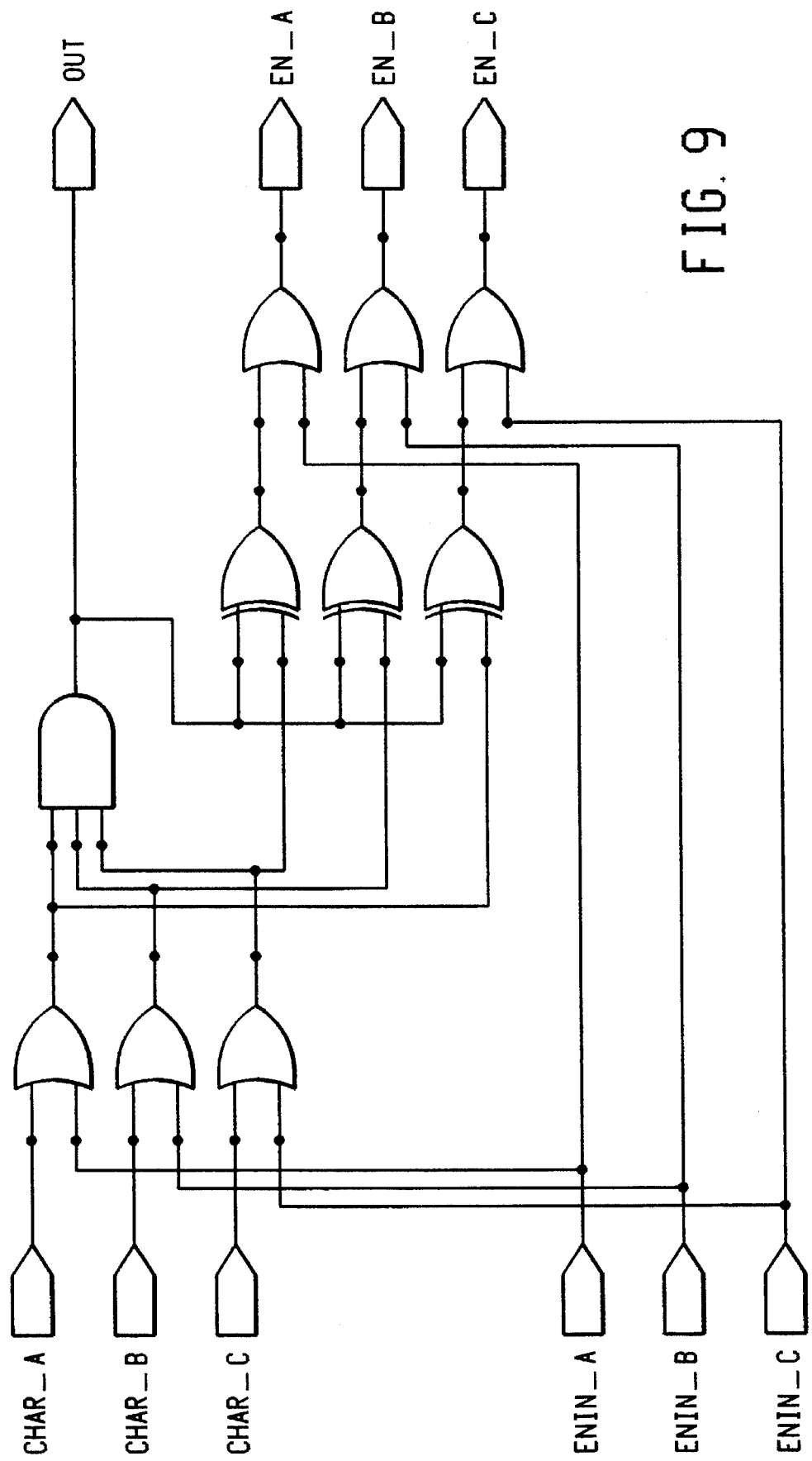
FIG. 9 is a circuit diagram of one of the minimum comparator stages shown in FIG. 8.

A minimum comparator was used to determine the smallest of three 6-bits inputs. The structure of the minimum comparator is shown in FIG. 8. The comparator uses a bit-serial n-way comparator. An enable signal is used for each bit position of each input to indicate whether that input is still active in the comparison. Hence, only the input(s) with the minimum value up to that bit position whose enable signal(s) is (are) allowed to participate in the comparison. Once the enable signal for an input becomes inactive, it is disabled from competing any further in the comparison. Since the difference values can also be negative, a 2's complement number representation was adopted. This meant that for the first bit (MSB), a 1 rather than a 0, qualified as the minimum value. This was achieved by inverting both the input and the output of the first bit from the minimum comparator. In FIG. 8, this is shown as a maximum comparator stage. The minimum comparator stage is shown in FIG. 9.

5.3 DESIGN PHILOSOPHY

The different steps involved in the design of the final chip layout are described below. A hierarchical design strategy was adopted during the schematic entry phase. The schematics were then stimulated to verify their function. Layout synthesis was used to translate the schematics into actual CMOS layouts. The connectivity in the layouts and schematics were then cross checked. Finally, the various layout blocks were arrayed, interconnected and placed within the standard frame.

Design Entry: The components of the chip were built using a set of library cells that were designed using the Cadence symbolic editor Composer. A hierarchical design approach was adopted wherein the top-level schematic was derived using blocks, each of which in turn was built using blocks at lower level, the lowest level being the standard library cells. The hierarchical approach made the design simpler as cells could be redesigned at a later stage for improved efficiency and easily incorporated into the circuit.

Design Verification: The VLSI layout of the chip was designed using the following steps. Once the final schematic was completed and tested, layout synthesis tools were used to generate the layout of the chip. Specifications relating to number of rows, layout style, substrate tap locations, etc., were input at this stage. The PE design was then run through a series of compactions until an optimum size layout was obtained (such that the most number of PEs could be placed within a 4.8 mm×6.4 mm MOSIS standard frame). Constraints were placed to align input and output pins to a PE such that PEs could then be arrayed. A Layout and Schematic verification step was performed to check whether the connectivity within the two representations was identical.

TABLE 1

| Chip Features | |
| --- | --- |
| Technology | 2 - μm SCMOS; λ = 1.0 (pwell) |
| Clock | 2 - phase non overlapping |
| Pin Details | 64 (36 inputs) (28 outputs) |
| Frame Area | 4.8 mm × 6.4 mm |
| PE Area | 4.3 mm × 0.7 mm |
| Character Range | ASCII Format range 1 to 127 |
| Transistor Count | PE 2390 |
| | Chip 20470 |

A linear array of 7 PEs was obtained by replicating the layout of a single PE. The PEs were stacked vertically. The chip required 64 pins for the external interface. Of these, 36 were input pins and 28 were output pins. The chip totally consists of 20470 transistors.

As mentioned earlier, m+n−1 PEs are required to compare strings of length m and n respectively. Stings that are too long to be compared within one pass through the array can be processed through multiple passes. A partitioning scheme for such a situation is discussed next.

6 Partitioning ,Scheme

When the stings are too long to be compared within one pass through the array, multiple passes are required. In this case, the data values shifted in along with the symbols represent a matrix row or column at some intermediate point in the calculation. A systolic array with m+n−1 PEs can process strings whose combined length is less than or equal to m+n in a single pass. However if the combined length is greater than m+n then multiple passes are required.

Assume an implementation with N PEs. Further, assume PE(j) performs computations for the central diagonal. In order to accomplish this assignment, one of the strings must be delayed with respect to the other by N−2j+1 cycles, as shown in Lemma 2. From Theorem 1 it can be seen that PE(i), $1 \leq i \leq j$ will perform computations for the diagonals starting at D(j−i+1,1), and PE(i,j≤i≤N) for the diagonals starting at D(1,i−j+1). This array can, therefore, process j symbols of String A and N−j+1 symbols of String B in a single pass.

Figure 10:
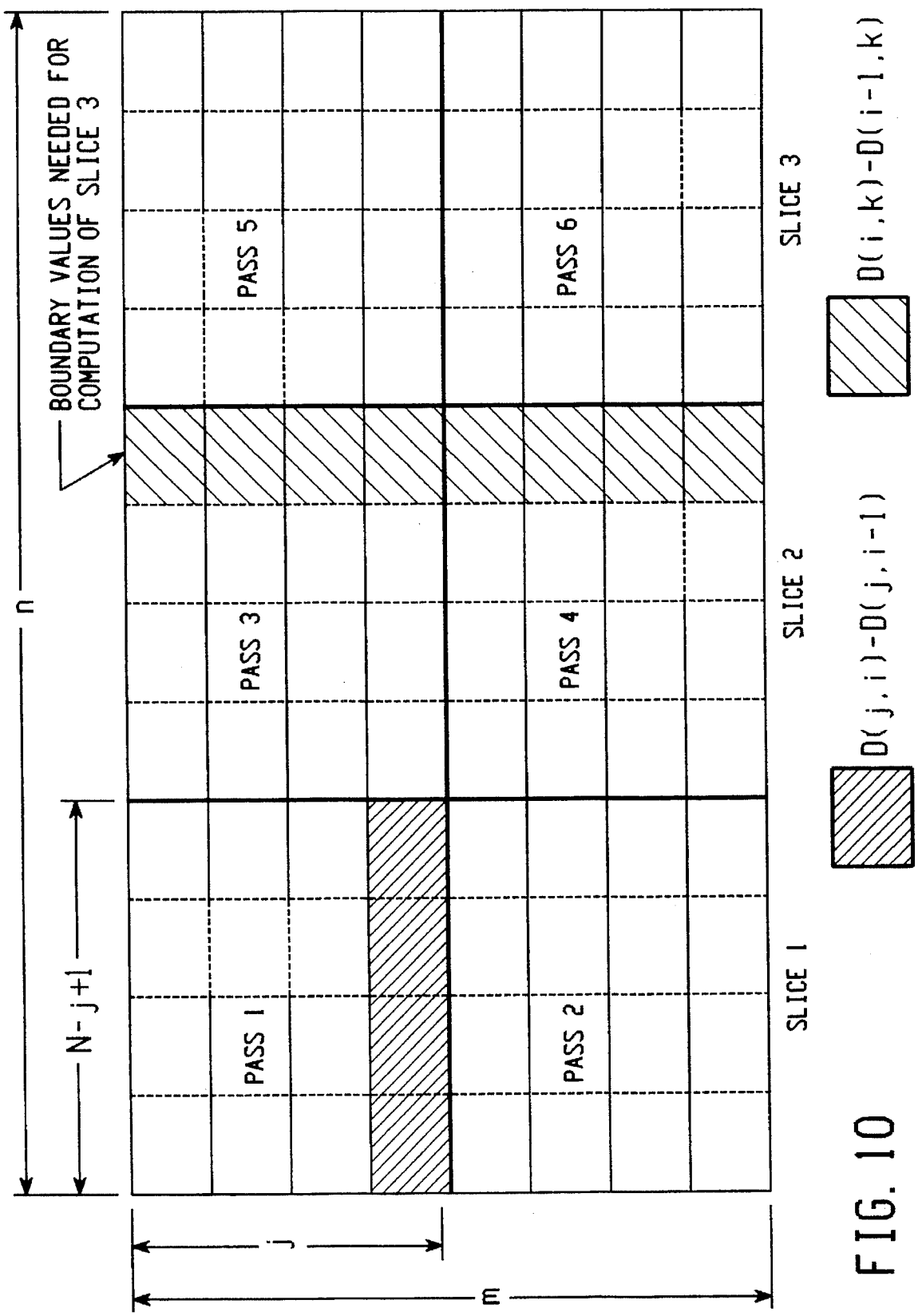
FIG. 10 is a diagram of a partitioning technique for handling strings that are too long to be compared with one pass through the array of processing elements.

The partitioning strategy is illustrated in FIG. 10. The problem space is divided into slices, which are computed sequentially. The size of each slice is s=N−j+1. Thus, $\lceil n/s \rceil$ slices need to be computed by the architecture. Each slice, in turn, requires multiple passes to be performed as shown. The number of passes required per slice is $\lceil m/j \rceil$. Therefore, to compare strings of length m and n on a systolic array having N PEs requires O(mnl(N−j+1)j] passes to be performed.

The j×(N−j+1) values that are computed within a pass are hereby referred to as a block. During any pass, if the differences for the left and top boundaries are available, the values within that block can be computed by the systolic array. The values above the first row of blocks are equal to I, and those to the left of the first column of blocks are equal to D. When a block is being processed, and String B is shifted out of the array, it carries with it the last row of that block. Similarly, when String A is shifted out, it carries with it the last column of that block.

Since the last row of block is needed for the computation of block $_{i+1}$ (within the same slice), the output stream carrying String B is used as the String B input for the next pass. While processing a slice, the same N−j+1 symbols of String B are compared with consecutive sets of j symbols of String A, in successive passes. The output streams carrying String A during the processing of a slice are stored. These values (which now represent String A) along with the next N−j+1 symbols of String B are used when the next slice is processed. This process is continued until the entire matrix has been computed.

An interesting feature of this partitioning is that extra storage space is not required for intermediate results. The output streams from either end of the systolic array can be written back into the locations from where the respective inputs for that pass were read. Sequencing of the inputs by the host machine would, therefore, be a trivial task. The array is expected to function s a hardware accelerator.

Accordingly, the foregoing description provides new and useful VLSI circuit structure which has been implemented on a VLSI chip, and can simply and efficiently determine the edit distance between two strings. From the foregoing description, it is believed that VLSI circuits, using the principles of the invention, can be constructed for various complex, computationally intensive tasks.

We claim:

1. A VLSI circuit structure for use in determining an edit distance between two strings, comprising (a) a systolic array of processing elements;

(b) each processing element receiving as inputs a pair of string symbols;

(c) each processing element including a comparator which compares the pair of string symbols input to the processing element and outputs a signal which has a first value if the pair of string symbols match and a second value if the pair of the string symbols do not match;

(d) each processing element further including a difference computation module which receives difference values associated with the pair of string symbols input to the processing element and also receives the output of the comparator, said difference computation module having stored therein editing costs for predetermined editing operations associated with the string symbols, said difference computation module producing a pair of outputs for the pair of string symbols, each of the outputs comprising a new difference value related to the editing cost for the pair of string symbols that was input and compared by the comparator, and (e) each processing element producing a pair of outputs, each of which comprises one string symbol of the pair of string symbols and the new difference value related to the editing cost for the pair of string symbols.

2. A VLSI circuit structure as defined in claim 1, wherein the systolic array of processing elements is designed to compute a distance matrix, each matrix element of which is represented by a pair of difference values and the left and top boundaries of which comprise accumulated edit values, each difference value representing the difference between a matrix element and its left and top neighbors, and wherein each difference value has a range from ±max (I,D), where I and D are insertion and deletion cost values stored in the computation modules of the processing elements.

3. A VLSI circuit structure as defined in claim 2, wherein the systolic array of processing elements is designed such that a processing element receives inputs from and direct outputs to processing elements on its opposite sides, the difference computation module of a processing element comprising a three-way minimum comparator which receives the 1 or 0 output from the comparator of the processing element and a pair of difference value inputs ($left_{in}$, $right_{in}$) from the processing elements on the left and right sides of the processing element, and directs difference value outputs ($left_{out}$, $right_{out}$) to the processing elements on the left and right sides of the processing element; the pair of difference value outputs ($left_{out}$, $right_{out}$) being determined by the three-way minimum comparator as follows:

$$right_{out} = min(left_{in}+I, right_{in}+D, dia) - right_{in}$$

$$left_{out} = min(left_{in}+I, right_{in}+D, dia) - left_{in}$$

Where dia=0 if the output of the comparator is 1 dia=S if the output of the comparator is 0

S=substitution cost value stored in the difference computation module

D=deletion cost value stored in the difference computation module

I=insertion cost value stored in the difference computation module.

4. A VLSI circuit structure according to claim 3 wherein said outputs of said processing elements comprise strings of string symbols with new difference values interleaved between the string symbols.

5. A VLSI circuit structure according to claim 4 further comprising an accumulator in circuit communication with one of said processing elements, said accumulator accumulating a value having a larger bit-width than the difference values.

6. A VLSI circuit structure according to claim 3 further comprising an accumulator in circuit communication with one of said processing elements, said accumulator accumulating a value having a larger bit-width than the difference values.

7. A VLSI circuit structure according to claim 2 wherein said outputs of said processing elements comprise strings of string symbols with new difference values interleaved between the string symbols.

8. A VLSI circuit structure according to claim 7 further comprising an accumulator in circuit communication with one of said processing elements, said accumulator accumulating a value having a larger bit-width than the difference values.

9. A VLSI circuit structure according to claim 2 further comprising an accumulator in circuit communication with one of said processing elements, said accumulator accumulating a value having a larger bit-width than the difference values.

10. A VLSI circuit structure according to claim 1 wherein said outputs of said processing elements comprise strings of string symbols with new difference values interleaved between the string symbols.

11. A VLSI circuit structure according to claim 10 further comprising an accumulator in circuit communication with one of said processing elements, said accumulator accumulating a value having a larger bit-width than the difference values.

12. A VLSI circuit structure according to claim 1 further comprising an accumulator in circuit communication with one of said processing elements, said accumulator accumulating a value having a larger bit-width than the difference values.

13. A circuit structure for use in determining an edit distance between a first string of string symbols and a second string of string symbols, comprising:

(a) a linear systolic array of processing elements having a first end processing element and a second end processing element, the first string of string symbols being input into said linear systolic array at said first end processing element and the second string of string symbols being input into said linear systolic array at said second end processing element;

(b) each processing element receiving as inputs string symbols with at least one value interleaved between the string symbols;

(c) each processing element including a comparator which compares at least a pair of the string symbols input to the processing element and generates an output signal which has a first value if the pair of the string symbols match and a second value if the pair of the string symbols do not match;

(d) each processing element further including a difference computation module which receives the at least one value interleaved between the string symbols input to the processing element and also receives a signal associated with the output signal of the comparator; said difference computation module having stored therein editing costs for predetermined editing operations associated with the string symbols; said difference computation module producing a pair of outputs for each pair of the string symbols, each of the outputs comprising a new scaled value related to the editing cost for the pair of the string symbols that was input and compared by the comparator; and (e) each processing element generating a pair of outputs, each of which comprises one string symbol of the pair of the string symbols and the new scaled value related to the editing cost for the pair of the string symbols.

14. A circuit structure according to claim 13, wherein said linear systolic array of processing elements computes a distance matrix, each matrix element of which is represented by a pair of difference values and the left and top boundaries of which comprise accumulated edit values, each difference value representing the difference between a matrix element and its left and top neighbors, and wherein each difference value has a range from±max (I,D), where I and D are insertion and deletion cost values stored in the computation modules of the processing elements.

15. A circuit structure according to claim 14, said difference computation modules comprising a three-way minimum comparator which receives a signal associated with the output signal of the comparator and a pair of difference value inputs ($left_{in}$, $right_{in}$) from the processing elements on the left and right sides of the processing element, and directs difference value outputs ($left_{out}$, $right_{out}$) to the processing elements on the left and right sides of the processing element; the pair of difference value outputs ($left_{out}$, $right_{out}$) being determined by the three-way minimum comparator as follows:

$$right_{out}=min(left_{in}+I,\ right_{in}+D,\ dia)-right_{in}$$

$$left_{out}=min(left_{in}+I,\ right_{in}+D,\ dia)-left_{in}$$

Where
- dia=0 if the output of the comparator is 1
- dia=S if the output of the comparator is 0
- S=substitution cost value stored in the difference computation module
- D=deletion cost value stored in the difference computation module
- I=insertion cost value stored in the difference computation module.

16. A circuit structure according to claim 15 further comprising an accumulator in circuit communication with one of said end processing elements, said accumulator accumulating a value having a larger bit-width than the difference values.

17. A circuit structure according to claim 13 wherein said outputs comprise strings of string symbols with the new scaled values interleaved between the string symbols.

18. A circuit structure according to claim 13 further comprising an accumulator in circuit communication with one of said end processing elements, said accumulator accumulating a value having a larger bit-width than the new scaled values.

19. A circuit structure according to claim 13 wherein said values interleaved between the string symbols comprise difference values.

20. A circuit structure according to claim 19 wherein said outputs comprise strings of string symbols with the new scaled values interleaved between the string symbols.

21. A circuit structure according to claim 20 further comprising an accumulator in circuit communication with one of said end processing elements, said accumulator accumulating a value having a larger bit-width than the difference values.

22. A circuit structure according to claim 13 wherein said values interleaved between the string symbols consist of difference values.

* * * * *